July 26, 1966  H. M. L. BOSTEELS  3,263,060
WIRE-FEEDING WELDING ASSEMBLY
Filed Oct. 26, 1964  2 Sheets-Sheet 1
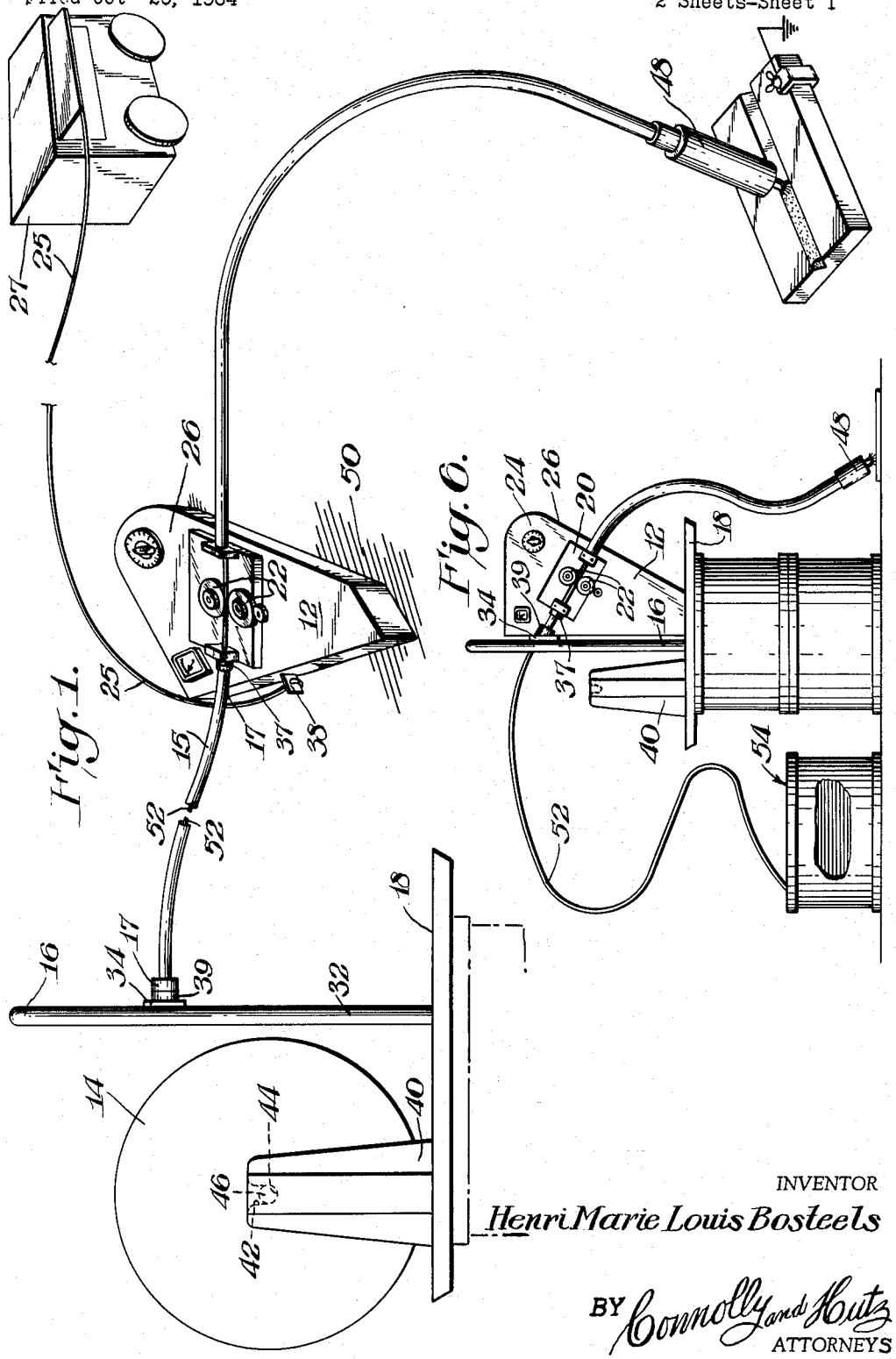
INVENTOR
Henri Marie Louis Bosteels
BY Connolly and Hutz
ATTORNEYS July 26, 1966  H. M. L. BOSTEELS  3,263,060
WIRE-FEEDING WELDING ASSEMBLY
Filed Oct. 26, 1964  2 Sheets-Sheet 2
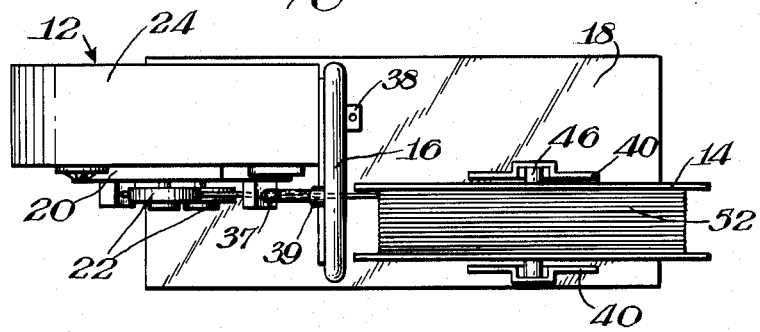
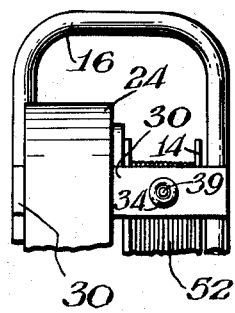
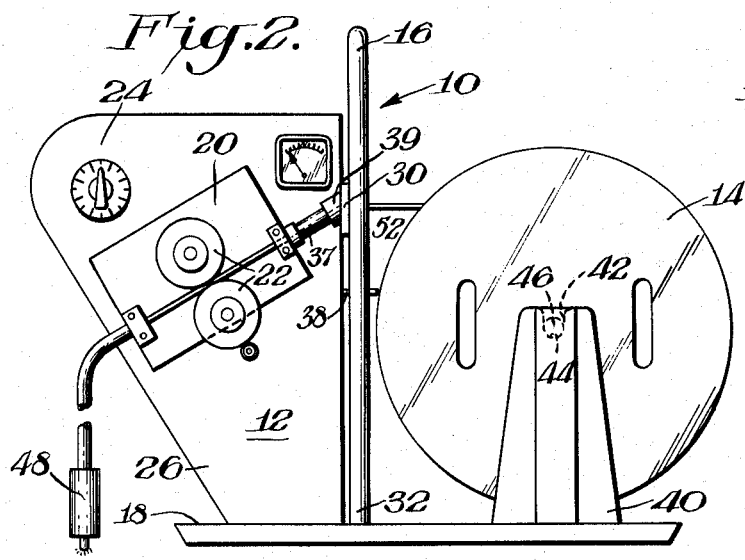
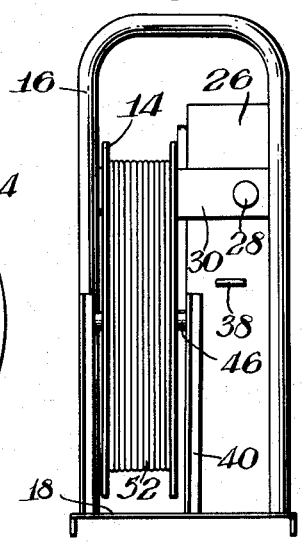
INVENTOR
Henri Marie Louis Bosteels
BY Connolly and Hutz
ATTORNEYS

United States Patent Office 3,263,060
Patented July 26, 1966

3,263,060
WIRE-FEEDING WELDING ASSEMBLY
Henri Marie Louis Bosteels, Lausanne, Switzerland, assignor to Central Welding Research Lab. Ltd., a corporation of Bermuda
Filed Oct. 26, 1964, Ser. No. 406,515
11 Claims. (Cl. 219—130)

This invention relates to a portable wire-feeding welding assembly, and it more particularly relates to such a welding assembly that is primarily adapted for semi-automatic operation.

This application is a continuation-in-part of application Serial No. 246,290, filed December 13, 1962, and application Serial No. 311,779, filed September 26, 1963.

A semi-automatic wire-feeding welding assembly should be as light and compact as possible to enhance its portability. However miniature versions of such devices have limited wire storage or unduly restrict the capabilities of the feeding and control assembly. Additionally, when the control components are detached from the assembly for use in remote areas, the wire is unprotected and accordingly is frequently broken or otherwise damaged.

An object of this invention is to provide a simple, compact and efficient assembly having a portable wire feeding device.

Another object of this invention is to provide such an assembly that affords versatility and compactness without unduly restricting its wire storage and operating effectiveness.

Still another object of this invention is to provide such an assembly that effectively protects the wire when the component is detached for remote use.

In accordance with this invention, a wire and control component is detachably secured to a carrier and a wire-feeding reel support is also mounted on the carrier. A tube coupling is connected to the component and another tube coupling is secured to the carrier adjacent the wire reel support. When the component is used in a location remote from the carrier, an elongated flexible hose can be attached to the tube couplings so that the wire is effectively protected as it is fed from the wire reel to the remotely located component. Additionally when the component is mounted on the carrier both tube couplings are aligned with each other so that the wire can be fed directly through both tube couplings and to the component.

In an advantageous form of this invention the carrier includes a handle structure mounted between the component supporting structure and the wire reel supporting structure. A wire feeding bearing in the handle structure guides the wire from the reel to the tube couplings. The handle structure may be an inverted U-shaped tubular element with its open end attached to the base of the carrier, and a plate may extend across its upper portion for mounting the wire feeding bearing and one tube coupling.

Novel features and advantages of the present invention will become apparent to one skilled in the art from a reading of the following description in conjunction with the accompanying drawings wherein similar reference characters refer to similar parts and in which:

FIG. 1 is a three-dimensional view of separated parts of an embodiment of this invention;

FIG. 2 is a side view in elevation of the embodiment shown in FIG. 1 with the parts mounted on the carrier;

FIG. 3 is a side elevational view of the embodiment shown in FIG. 2;

FIG. 4 is a partial view of the side opposite to that shown in FIG. 3;

FIG. 5 is a top plan view of the embodiment shown in FIGS. 2–4; and

FIG. 6 is a side view of the embodiment shown in FIGS. 1–5 in operation from a payoff pack.

In FIGS. 2–5, is shown a semi-automatic wire-feeding welding assembly 10 including a wire-feeding and control component or device 12 and a wire reel 14 mounted upon opposite sides of handle structure 16 secured to a substantial central area of a base 18. Device 12 is for example, very similar to that described in parent application S.N. 246,290, filed December 13, 1962, and it includes a wire feeding component 20 having a pair of wire feeding rollers 22 and a control component 24 disposed within casing 26. Device 12 is detachably secured to assembly 10 by capscrew 28 (as shown in FIG. 3) inserted through bracket plate 30 secured to the upper portion of handle structure 16.

Handle structure 16 is tubular and fabricated in an inverted "U-shape" with its open ends 32 welded to base 18 which is also made of steel. A wire feeding bearing 34 incorporating an insert of a lubricating material such as nylon or Teflon is also attached to bracket plate 30. As shown in FIG. 3 terminal 38 extends from the side of casing 26 to provide a convenient shielded means for connecting a source of electrical power thereto.

A hose coupling 37 is attached to control component 12 adjacent rollers 22. A second hose coupling 39 is attached to bearing 34 on plate 30. As shown in FIG. 2 when component 12 is mounted upon handle structure 16 hose couplings 37 and 39 are aligned with each other. Accordingly, when the assembly is used in this position wire 52 from reel 14 is inserted through bearing 34 and then through both hose couplings 39 and 37 between rollers 22 for use in torch 48. Hose couplings 37 and 39 thus act as convenient guides for wire 52 while also shielding or protecting it.

A pair of wire reel supports 40 are also welded to a portion of base 18 remote from component 12, and a convenient detachable means for engaging reel 14 is provided by slots 42 with rounded bases 44 in the upper portions of support 40. Axle 46 of reel 14 may accordingly be conveniently inserted and removed from slots 42. Assembly 10 may thus be conveniently utilized in the assembled condition by carrying it adjacent most locations and operating torch 48 therefrom.

When a fairly inaccessible location with restricted entrance openings are encountered, device 12 is removed from handle structure 16 and carried to a location such as 50 where it would be impossible or inconvenient to carry the entire assembly 10. An elongated flexible hose 15 is secured by its couplings 17 to hose coupling 37 on component 12 and to hose coupling 39 on bearing 34. Hose 15 is for example an extendable garden hose which effectively shields wire 52 when it is fed from reel 14 to component 12 as shown in FIG. 1. Power is supplied to the component 12 by welding cable 25 engaging terminal 38 and generator 27.

FIG. 6 shows how assembly 10 is used on conjunction with a payoff pack 54 by removing reel 14 from support 40 and connecting wire 52 from payoff pack 54 through bearing 34 and then through hose couplings 39 and 37 to device 12. As shown in FIG. 6 in this arrangement only a short portion of wire 52 is exposed between payoff pack 54 and bearing 34. Then, as in the FIG. 2 arrangement wire 52 is guided and protected by tube couplings 37 and 39.

What is claimed is:

1. A wire-feeding welding assembly comprising a carrier, a wire-feeding and welding control component, detachable means connecting said component to said carrier, a wire feeding reel mounting means on said carrier, tube coupling means on said carrier adjacent said reel mounting means, tube coupling means on said component whereby a flexible tube may be installed between the tube coupling means on said carrier and the tube coupling means on said component when said component is detached from said carrier to protect the wire of said reel when it is fed to said component and to facilitate the positioning of said component at a location remote from said carrier, and both of said tube coupling means being aligned with each other when said component is mounted on said carrier whereby the wire from said reel may be inserted through both of said tube coupling means to said component to facilitate the use of said component on said carrier.

2. An assembly as set forth in claim 1 wherein an upstanding handle structure is mounted upon said carrier, said reel mounting means being on said one side of said handle structure and said detachable coupling means being on the other side of said structure.

3. An assembly as set forth in claim 2 wherein wire-feeding bearing means is on said handle structure, said bearing means being between said reel support means and the first of said tube coupling means whereby the wire from said reel is adapted to be fed through said bearing means and then through both of said tube coupling means to said component.

4. An assembly as set forth in claim 3 wherein said first tube coupling means is connected to said bearing means.

5. An assembly as set forth in claim 2 wherein said handle structure is an inverted U-shaped tubular element having its open end attached to the base of said carrier, bracket plate means extending across the closed end of said structure and said bearing means being disposed in said bracket plate means for dependably guiding the wire upon said reel.

6. An assembly as set forth in claim 5 wherein said tube coupling adjacent said reel support means is connected to said bearing means.

7. An assembly as set forth in claim 5 wherein said detachable coupling means comprises a capscrew coupling said component to said handle structure.

8. An assembly as set forth in claim 2 wherein said reel support means includes a pair of posts mounted on said carrier, a slotted aperture in each of said posts, and an axial shaft adapted to receive said reel being disposed with each end in a respective slotted aperture.

9. A wire-feeding assembly comprising a carrier, a wire-feeding and welding control component disposed remote from said carrier, a wire reel, wire reel support means securing said wire reel to said carrier, tube coupling means on said carrier adjacent said wire reel, tube coupling means on said component, an elongated flexible hose detachably installed between both of said tube coupling means, wire on said reel extending through said hose and to said component whereby said elongated flexible hose protects said wire when it is fed to said component, detachable coupling means for mounting said component on said carrier, and both of said tube coupling means being aligned with each other when said component is mounted on said carrier and said elongated flexible hose is detached from said assembly whereby said wire may be inserted through both of said tube coupling means to facilitate the use of said component on said carrier.

10. A wire feeding welding assembly comprising a carrier, a wire feeding and welding control component, detachable coupling means mounting said component on said carrier, a wire reel on said carrier, tube coupling means on said carrier adjacent said reel, tube coupling means on said component, and both of said tube coupling means being aligned with each other whereby wire on said reel may be inserted through both of said tube coupling means to said component.

11. A wire feeding welding assembly comprising a carrier, a wire feeding and welding control component mounted upon said carrier, a wire containing payoff pack, tube coupling means disposed adjacent said payoff pack for receiving the wire therefrom, and tube coupling means on said component aligned with said first tube coupling means whereby wire may be fed from said payoff pack and inserted through said tube coupling means to said component.

References Cited by the Examiner

UNITED STATES PATENTS 2,880,305 3/1959 Baird _____ 219—130
3,119,042 1/1964 Marshall _____ 314—68

FOREIGN PATENTS 218,467 11/1958 Australia.

RICHARD M. WOOD, *Primary Examiner.*

ANTHONY BARTIS, *Examiner.*